Patented Nov. 3, 1936

2,059,273

UNITED STATES PATENT OFFICE 2,059,273

CHEMICAL COMPOUNDS DERIVABLE FROM UREA AND ETHYLENE OXIDE, AND USEFUL AS TEXTILE ASSISTANTS

Henry Alfred Piggott, Blackley, Manchester, England, assignor to Imperial Chemical Industries Limited, a corporation of Great Britain No Drawing. Application January 22, 1935, Serial No. 2,971. In Great Britain January 22, 1934

14 Claims. (Cl. 260—106)

According to the present invention I manufacture new textile assistants by condensing urea with ethylene oxide, under such conditions that several molecular proportions of ethylene oxide enter into combination for one molecular proportion of urea entering into combination, and by then treating the products obtained with the fatty acids that are derived from natural fats and fatty oils.

Also according to the invention I apply the new products obtained as described in the preceding paragraph as textile assistants, for instance as dispersing, wetting and emulsifying agents.

In carrying the invention into practical effect the urea may be heated with a quantity of ethylene oxide which is several times i. e. up to about 40 times (i. e. 55 molecular proportions) its own weight, until all or substantially all the ethylene oxide has entered into combination. The combination may be assisted by the use of catalysts namely, substances having in aqueous solution an alkaline reaction, (e. g. sodium hydroxide, sodium carbonate, borax) and surface active materials, e. g. silica gel, diatomaceous earth, and natural or synthetic zeolites.

In carrying the second step of the invention into practical effect methods known per se for acylating alcohols may be used, for instance the methods which comprise treating with acids, acid anhydrides and acid halides, but it is sufficient to use the acid itself and effect the acylation by a simple heating together of the reagents. Stearic, oleic, or palmitic acids may be used, or their anhydrides, (e. g. palmitic anhydride, stearic anhydride), or halides.

The products are believed to have a structure represented by the formula

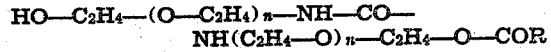

where $n$ may be any number up to 25 (preferably 20) and R—CO represents the radical of a fatty acid.

The following examples in which parts are by weight, illustrate but do not limit the invention.

Example 1

A mixture of 1 part of urea with 30 parts of ethylene oxide is heated in a closed pressure-resisting vessel at 120° C. for 9 hours. A brown mobile liquid is thus obtained and this is readily soluble in water to a clear solution. It is also soluble in ethyl alcohol. Ninety per cent of the ethylene oxide is found to have entered into combination.

14 parts of the above liquid are heated with 2.4 parts of stearic acid at 160° C. while stirring, until a sample of the mixture is completely soluble in water. A brown semi-solid waxy substance, readily soluble in water to a clear, foaming solution is thus obtained. If the product be added to an indigo vat, dyeings which are slightly greener in shade and much faster to rubbing are obtained. The product may also be added with advantage to the dyebaths which are used in dyeing with chrome blacks; dyeings fast to rubbing are thus obtained.

Example 2

In this example about 35 parts of ethylene oxide are used to 1 part of urea (cf. Example 1). 12 parts of urea and 0.1 part of caustic soda as 8% aqueous solution are charged into an autoclave which is then closed. 44 parts of ethylene oxide are then pumped in and the mixture is heated to 85–90° C. in the course of 8-9 hours. Further ethylene oxide is then pumped in as the condensation proceeds, a further 380 parts being added in the course of 20-30 hours, the progress of the reaction being followed by the fall in internal pressure as condensation proceeds. Such by-products (glycol etc.) as are volatile are now removed by evacuating the vessel and heating it at about 100° C. until nothing more distils over. The residue, being the desired product is then blown into a suitable receptacle. The product resembles that of Example 1; it is a brown viscous liquid, readily soluble in water and in fact miscible therewith in all proportions.

141 parts of the brown liquid are heated with 28 parts of oleic acid in an open pan at 160° C. until the melt is readily soluble in benzene. It is then allowed to cool. In this way are obtained 169 parts of a condensation product which is a viscous liquid, readily soluble in water to a pale yellow strongly foaming solution.

Example 3

When instead of the oleic acid used in Example 2, 29 parts of ricinoleic acid are used a dark brown greasy substance is obtained which is readily soluble in benzene and soluble in water. The aqueous solution resembles that of the product of Example 2. Mineral oils are easily emulsified by this aqueous solution, and stable emulsions are obtained.

Example 4

11 parts of a urea ethylene oxide condensation product made as described in Example 2, but from 15 parts of urea and 450 parts of ethylene oxide are heated with 1.7 parts of lauric acid at 160° C. for 2 hours. A pale brown waxy substance is obtained readily. This is readily and completely soluble in water. The aqueous solution forms readily and has marked wetting properties.

It will be noted that the quantity of esterifying agent selected in the above examples is less than two mols per mol of the condensation product, in order not to block completely all the OH groups of the compound. An excess over one mol, however, is desirable to insure complete reaction as to one of the available OH groups in each molecule. The preferred range is from about 1 to 1.5 mols of esterifying agent per mol of condensation product, as shown by the above examples.

I claim:

1. As a new compound, the partial esterification product of a higher monobasic fatty acid and the dihydroxy compound obtainable by condensing urea with a plurality of molecular proportions of ethylene oxide, said compound being characterized by pronounced emulsifying, wetting and dispersing properties.

2. A compound of the general formula

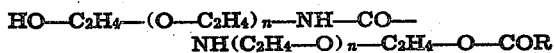

wherein $n$ stands for an integer up to 25, and —O—COR represents the radical of a long-chain fatty acid.

3. A compound of the general formula

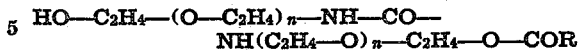

wherein $n$ stands for an integer of about 20 to 25, and R is an alkyl chain of at least 11 carbon atoms.

4. A process for the manufacture of a chemical compound having emulsifying, wetting and dispersing properties, which comprises condensing urea with a plurality of molecular proportions of ethylene oxide, and then treating the so-obtained compound with an esterifying agent adapted to introduce the radical of a long-chain fatty acid.

5. A process as in claim 4 wherein about 40 to 55 molecular proportions of ethylene oxide are used per mol of urea.

6. A process as in claim 4 wherein the esterifying agent is selected in quantity less than requisite to esterify all the available OH groups, but at least sufficient to esterify half of them.

7. The process which comprises condensing 1 mol of urea with about 40 mols of ethylene oxide, and then reacting upon the condensation product with one-and-a-half equivalents of an esterifying agent selected from the group consisting of the free acids, anhydrides and halides of fatty acids having at least 12 carbon atoms per molecule.

8. The intermediate compound obtainable by condensing 1 mol of urea with from 40 to 55 molecular proportions of ethylene oxide, said compound being a brown liquid, soluble in water and in ethyl alcohol, and being further characterized by its capacity to react with higher fatty acids, to produce a compound having surface-active properties.

9. A compound of the general formula

wherein $n$ is an integer of about 20 to 25, said compound being a brown liquid, readily soluble in water and in ethyl alcohol.

10. The process of producing an intermediate chemical compound which comprises condensing 1 mol of urea with a plurality of molecular proportions of ethylene oxide, up to 55.

11. The process of producing an intermediate chemical compound which comprises heating under pressure 1 part of urea with from 30 to 40 parts by weight of ethylene oxide at a temperature between 85 and 120° C., and recovering the liquid, water-soluble condensation product thus produced.

12. A process as in claim 11, the reaction being carried out in the presence of a catalyst.

13. A process as in claim 11, the reaction being carried out in the presence of a surface active material.

14. A process as in claim 11, the reaction being carried out in the presence of a caustic alkali.

HENRY ALFRED PIGGOTT.